United States Patent [19]

Martyak et al.

[11] Patent Number: 5,328,616
[45] Date of Patent: Jul. 12, 1994

[54] METHODS AND APPARATUS FOR TREATING ELECTROLESS PLATING BATHS

[75] Inventors: Nicholas M. Martyak, Ballwin; Bruce F. Monzyk, Maryland Heights; Henry H. Chien, St. Louis, all of Mo.

[73] Assignee: Monsanto Company, St. Louis, Mo.

[21] Appl. No.: 29,942

[22] Filed: Mar. 9, 1993

Related U.S. Application Data

[63] Continuation of Ser. No. 979,580, Nov. 20, 1992, abandoned.

[51] Int. Cl.$^5$ ............................................. B01D 6/04
[52] U.S. Cl. .................................... 210/638; 210/259; 210/652
[58] Field of Search .................. 204/182.4; 210/638, 210/651, 652, 620, 665, 259

[56] References Cited

U.S. PATENT DOCUMENTS

| | | | |
|---|---|---|---|
| 4,276,177 | 6/1981 | Smith | 210/259 X |
| 4,834,886 | 5/1989 | Cadotte | 210/500.38 X |
| 4,985,661 | 1/1990 | Cadotte | 210/651 |
| 5,039,497 | 8/1991 | Weber et al. | 423/24 |

FOREIGN PATENT DOCUMENTS

| | | |
|---|---|---|
| 192310 | 8/1986 | European Pat. Off. |
| 56044778 | 4/1981 | Japan |
| 56044779 | 4/1981 | Japan |

*Primary Examiner*—Frank Spear
*Attorney, Agent, or Firm*—Thomas E. Kelley; Mark F. Wachter

[57] ABSTRACT

Apparatus and methods for removing formate ions from electroless metal plating baths employing formaldehyde as a reducing agent and typically comprising polyvalent anions as metal chelant and/or counterion. The apparatus and methods employ anion filtration to separate polyvalent anions from monovalent formate ions and ion exchange units to remove metal and metal chelant species from formate-containing streams. Preferred aspects of this invention provide apparatus and methods for removing formate from electroless copper plating baths.

27 Claims, No Drawings

METHODS AND APPARATUS FOR TREATING ELECTROLESS PLATING BATHS

This application is a continuation of Ser. No. 07/979,580 filed Nov. 20, 1992, now abandoned.

Disclosed herein are methods and apparatus for treating electroless plating baths, e.g. removing by-product formate ions from electroless copper plating baths. Also disclosed are methods and apparatus for recycling materials from such baths and treating baths for disposal.

BACKGROUND OF THE INVENTION

Plating baths for the electroless deposition of copper are common and typically comprise a copper salt, e.g. copper sulfate, a complexing agent such as EDTA and a formaldehyde reducing agent. As copper is depleted from such plating baths, formaldehyde is oxidized to a formate and excess sulfate ions are generated. Copper ions and formaldehyde can be added to replenish a plating bath. Removal of formate and sulfate ions can be effected by withdrawing a purge stream. Besides the unwanted formate and sulfate ions, a purge stream also contains valuable species such as copper ions, formaldehyde and EDTA. Environmental awareness of the robustness of EDTA for the mobilization of toxic metals makes it less desirable to dispose of EDTA-containing solutions in waste streams.

Spent plating baths are traditionally treated by adding reducing agent such as sodium borohydride to precipitate elemental metal; residual soluble metal is precipitated with strong complexing agents, e.g. dithiocarbamate. Metal chelant complexes can be decomposed by oxidizing chelants, e.g. with peroxides, perchlorates or other oxidizing acids.

Because of the difficulties in treating spent plating baths, disposal in landfills is often a method of choice for disposing of spent plating solutions or metal sludge precipitate from plating baths. For instance, metal recyclers often prefer to avoid spent electroless nickel solutions because of the high phosphorus content.

U.S. Pat. No. 5,039,497 discloses methods of removing copper from sulfate solutions using aliphatic oximes. Cognis, Inc. (Santa Rosa, Calif.) has disclosed that such an extraction process can be used to treat copper and nickel electroless solutions to reduce the metal content producing a solution suitable for disposal, e.g. by sewering. Such solvent extraction methods have not been enthusiastically adopted for treating plating baths comprising copper complexed with EDTA, in part because common commercial extractants are not especially effective in extracting copper from complexes with EDTA.

Cardotte in U.S. Pat. No. 4,985,661 discloses the use of hyperfiltration membranes to process copper electroless plating solutions, e.g. to concentrate for re-use salts of EDTA. Such membranes are more permeable to formaldehyde and formate ions than EDTA salts. It has been found that a sufficiently high level of copper salts permeate such membranes both as formate salts and EDTA salts. Such copper-containing permeate streams are unsuitable for waste disposal in many places. Moreover, such EDTA-concentrated streams are typically unsuited for recycle without further treatment, e.g. to remove another anions, most commonly sulfate which is present as the principal copper counterion.

SUMMARY OF THE INVENTION

This invention provides apparatus and methods for removing formate ions from electroless metal plating baths employing formaldehyde as a reducing agent and typically comprising polyvalent anions as metal chelant and/or counterion. The apparatus and methods of this invention employ anion filtration to separate polyvalent anions from monovalent formate ions and ion exchange units to remove metal and metal chelant species from formate-containing streams.

Preferred aspects of this invention provide apparatus and methods for removing formate from electroless copper plating baths. These and other aspects and advantages of the subject matter of this invention will be apparent from the following detailed description and illustrative examples.

DETAILED DESCRIPTION OF PREFERRED EMBODIMENTS

As used herein the term "chelant" means a compound which can form a water soluble metal complex, e.g. EDTA or tartrate are useful chelants for copper in electroless copper plating baths. Compounds known as sequestrants are intended to be within the scope of the term chelant as it is used herein.

When formaldehyde is used as a reducing agent for electroless plating baths, metal deposition is effected by simultaneous oxidation-reduction reactions. That is, metal is reduced as it is deposited while formaldehyde is oxidized to formate. For instance, cupric salt and formaldehyde are typically added to replenish electroless copper plating baths with the result that such baths are progressively contaminated with oxidized reducing agent, e.g. formate ion, and excess copper counterion. Replenishment of metal species in such baths can be effected by electrolytic dissolution into a chelant solution. For instance, electroless copper plating baths free of non-chelant counterion can be produced by electrolytically dissolving a copper anode in a chelant, e.g. tartrate, solution in the presence of a depolarizer, e.g. ammonia. Alternatively, a concentrated copper salt can be provided on one side of a cationic membrane, e,g. a Nafion membrane; a current passed through the cell will transport copper cations from the salt side of the membrane to a chelant solution on the other side of the membrane. While the generation of excess metal counterion can be prevented, excess by-product formate ion must invariably be removed, typically by purging a working bath or treating the entirety of a spent bath.

Depending on the economic value of the metal chelant and reducing agent, it is often desirable to separate and recycle the chelant and/or reducing agent from by-product species, e.g. oxidized reducing agent or excess counterion. Moreover, when formaldehyde-reduced electroless plating baths comprise polyvalent chelant, the monovalent formate ion can be advantageously separated from polyvalent chelants by anion filtration using porous membranes having anionically functionalized surface. Such membranes are more selectively permeable to neutral and monoanionic solutes and less permeable to polyvalent anionic solutes. Thus, monovalent counterions for metal and neutral formaldehyde species are removed with monovalent formate ions, but polyvalent counterions would be rejected along with polyvalent chelants. An aspect of this invention provides methods for recycling metal as metal chelant species that are rejected by the anion filtration membrane. Because membranes are not absolute filters of polyvalent anions, some metal chelant species will invariably permeate the membrane. In addition, some metal typically associated with formate ions will permeate the membrane. Thus metal associated with formate as a counterion and with polyvalent chelant will contaminate the formate-containing stream rendering it less suitable for disposal. This invention provides apparatus and methods for removing metal species from formate-containing streams.

For example, a purge stream from a copper electroless plating bath will typically comprise cupric ions, formate ions, formaldehyde, polyanionic copper chelant species such as EDTA or tartrate and, unless otherwise provided by excess chelant or formate ions, a monovalent or polyvalent counterion for copper such a acetate or sulfate. Such solution can be conducted to a membrane filtration unit under sufficient pressure to effect permeation, resulting in a permeate stream and a residual stream. The concentration of formate ions and formaldehyde in the permeate stream and residual stream will be essentially the same as in feed stream. The concentration of cupric ions will be lower in the permeate stream and higher in the residual stream than in the feed stream. When a monovalent counterion such as acetate is present, its concentration tends to remain essentially unchanged like that of other monovalent permeable species. Polyvalent counterion species, when present, tend to concentrate with the metal-chelant species. Provided there is not an excess of free polyvalent counterion species, the residual stream containing metal-chelant species can generally be recycled to the electroless deposition bath. The permeate stream containing by-product formate ions can be conducted to an ion exchange unit to remove contaminant metal. When the chelant is one that strongly bonds to metal, e.g. with bonding on the order of the bonding to EDTA to copper, commonly available cation exchange resins are not suited for extracting the metal from the chelant complex. However, the metal-chelant complex is often sufficiently anionically charged as to be extracted as a unit using an anion exchange resin, a quarternary ammonium-functionalized resin such as e.g. Amberlite IRA-400 available from Rohm & Haas. When the chelant is one that weakly bonds to metal, e.g. with bonding on the order of the bonding to tartrate to copper, commonly available cation exchange resins, metal chelating resins functionalized with iminodiacetic acid (IDA) groups such as Amberlite IRC-718 resin available from Rohm & Haas, are generally suited for extracting the metal from the chelant complex.

Thus one aspect of this invention comprises conducting a formate-containing permeate stream to an ion exchange unit containing (i) a chelating ion exchange resin capable of removing metal ions from a solution in which said metal ions are complexed a chelant having a binding energy on the order of the binding energy of copper tartrate or (ii) an anion exchange resin capable of removing metal chelant complexes from a solution in which said metal ions are complexed with a chelant having a binding energy on the order of the binding energy of copper EDTA, thereby providing a formate ion-containing stream which is essentially depleted of metal ions and metal chelant complexes. The effluent from such an ion exchange unit will also contain other monovalent anions and neutral compounds such as formaldehyde. Multi-staged membrane filtration can provide substantial enhancement of separation efficiency.

In another aspect of this invention it is sometimes desirable to separate and recycle metal as a first step, e.g. by delivering an electroless plating bath purge stream to a solvent extraction unit prior to anion filtration. Solvent extraction units typically comprise a series of mixing/settling vessels to provide intimate mixing and subsequent separation of an organic liquid and an aqueous liquid. Multi-staged extraction columns with countercurrent flow provide high efficiency liquid extraction. For example, an aqueous liquid comprising a purge stream from such an electroless copper plating bath comprising an aqueous solution of cupric ions, formate ionis, formaldehyde and polyanionic cupric chelant species is intimately mixed with an organic liquid containing a cupric-extractant, e.g. in kerosene. During intimate mixing of aqueous an organic liquids, metal ions cross the phase boundary into the organic solution as a complex with the extractant. When mixing is stopped the phases separate, e.g. in an automatic decanter apparatus. When a number of stages of such mixers and decanters are provided in a series, a high degree of efficiency can be attained, providing a metal ion-depleted aqueous stream and a metal-extractant organic stream. In summary, solvent extraction units typically comprise means for contacting a metal-containing feed stream with an organic solvent solution and means for separating an organic stream containing metal-extractant complex and an aqueous stream depleted in said metal species.

Effective solvent extraction requires the use of an extractant which exhibits a binding energy in a metal-extractant complex that is greater than the binding energy of the metal ions to the metal chelant species in the electroless plating bath. For instance, the bond strength of EDTA-copper complexes is sufficiently high as to resist copper extraction by common extractants, e.g. oximes. Preferred metal extractants for use in this invention are hydroxamic acids which are advantageously capable of extracting copper from EDTA complexes. Preferred hydroxamic acids with enhanced hydrolytic stability for cost effective long term use include N-alkyl alkanohydroxamic acids, e.g. N-methyl alkylhydroxamic acids, N-ethyl alkyl hydroxamic acids. Especially preferred are N-ethyl hydroxamic acids disclosed in U.S. patent application Ser. No. 07/890,882.

In this method of recycling metal, an organic stream containing metal-extractant complex is contacted with an acid stream to provide an aqueous stream having dissolved therein the metal salt of the stripping acid. When it is desired to recycle recovered metal directly into the plating bath, useful acids include any of the acids corresponding to the metal counterions or chelant used in the bath.

Because solvent extraction processes are seldom 100% effective in removing metal, the metal ion-diminished aqueous stream from the solvent extraction step may contain sufficient metal, e.g. as metal-chelant complex, to preclude its direct disposal, e.g. in municipal sewerage treatment facilities. Such residual metal-chelant complexes can often be removed by reducing the pH of the metal ion-diminished aqueous stream, e.g. to pH less than 2, to selectively form a precipitate of polyanionic metal chelant species which is readily removed by settling, filtration, centrifugation, etc. Removal of such precipitate provides a substantially cupric chelant-depleted stream. Trace amounts of metal, e.g. copper complexed with a weak chelant such as tartrate, can be removed by conducting the solvent extracted stream to an ion exchange unit containing a chelating ion exchange resin.

Regardless of recycling method, e.g. anion filtration or solvent extraction, it is generally preferred to reduce the pH of the purge stream to increase its stability against autocatalytic deposition of metal.

The preferred method for treating sulfate-free plating bath to allow recycling of valuable materials while producing an environmentally acceptable, i.e. biodegradable, waste stream depends on the chelant. For instance, with baths containing weak chelant, e.g. tartrate, the initial treatment of a purge stream can be either (i) anion filtration with recycle of the residual stream and the permeate stream being treated by chelant precipitation, if necessary, followed by ion exchange or (ii) liquid extraction where the raffinate stream is treated by chelant precipitation and ion exchange. With baths containing strong chelants, e.g. EDTA, the initial treatment is preferably anion filtration which allows recycle of valuable EDTA as a copper complex; the chelant in the permeate stream can be destroyed, followed by ion exchange.

While the following examples illustrate the use of various materials in embodiments of plating solutions and methods of this invention, it should be clear from the variety of species illustrated that there is no intention of so limiting the scope of the invention. On the contrary, it is intended that the breadth of the invention illustrated by reference to the following examples will apply to other embodiments which would be obvious to practitioners in the plating arts.

EXAMPLE 1

This example illustrates the removal of tartrate from an electroless copper plating solution comprising 0.063M cupric ion, 0.2M tartrate, 0.18M formaldehyde, $1.15 \times 10^{-4}$M cyanide at pH 12.4. The solution was mixed with a 12% solution of N-ethyl decanohydroxamic acid in kerosene and allowed to settle, separating into two phases. Although phase separation was somewhat slow, separation was essentially complete with essentially no copper in the aqueous phase.

With a plating bath of similar composition but of pH of 8–10, phase separation was more rapid with essentially no residual copper in the aqueous phase.

When the procedure is repeated using EDTA, QUADROL, or NTA in place of tartrate, copper separation was significantly slower. Depending on the pH little or no copper extraction was effected. But with higher concentrations of hydroxamic acid, e.g. about 22%, enhanced copper extraction was demonstrated from solutions containing these stronger chelants.

EXAMPLE 2

This example illustrates the solvent extraction of copper from a copper electroless plating bath where the copper was chelated with tartrate. A purge stream from the plating bath containing 3260 ppm Cu was fed to a two stage solvent extraction unit comprising two mixer-settler devices configured for one stage of extraction and one stage of stripping. That is extraction of copper from an aqueous stream into an organic extractant phase was conducted in the first mixer-settler and stripping of copper from the organic phase with an acid was conducted in the second mixer-settler. The feed flow rate of copper bath purge into the extraction stage was 20.0 ml/min. An extraction solution was prepared by dissolving 12 wt % N-ethyl decanohydroxamic acid in an organic solvent mixture of 95 vol % high flash point kerosene (Kermac 470 B) and 5 vol % isodecyl alcohol. The flow rate of the organic extraction solution back and forth between the extraction stage and stripping stage was also 20.0 ml/min. The stripping solution was 10% sulfuric acid strip acid had a flow rate of 0.67 ml/min to the stripping stage. The mixer size was 640 ml for the extraction circuit and 180 ml for the strip circuit. The extraction settler was 640 ml and the strip settler was 450 ml.

The solvent extraction unit was operated at the described flow rates; when steady state conditions were attained the raffinate, i.e. the aqueous effluent from the extraction mixer-settler, had a copper concentration of 11 ppm. The copper sulfate effluent from the strip mixer-settler had a copper concentration of 99,300 ppm which was successfully used to prepare another electroless copper plating bath.

EXAMPLE 3

This example illustrates the recovery of tartrate from a copper electroless plating bath. A volume of raffinate from the extraction stage described in Example 1 was adjusted to pH 3.5 at room temperature whereupon potassium hydrogen tartrate crystals started to form. Crystallization was complete after one hour where 75% of the tartrate had crystallized out of solution. Cooling increased the recovery further. Experience indicates that pH 3.0 is almost as effective as pH 3.5 but that pH 2.5 results in a only 65% tartrate crystallization at room temperature. Experience with small volumes also indicates that about 50 minutes is required for optimum crystallization. Additional cooling, e.g. to about 15° C., enhances the amount of crystallization. The resulting "cream of tartar" crystals (potassium-hydrogen tartrate) quickly settle producing a clear supernatant which can be withdrawn easily without the need for filtration. The cream of tartar crystals readily redissolved in caustic solution producing a clear tartrate solution which was used effectively in the formulation of new copper-tartrate plating bath.

After removal of the cream of tartar crystals, the supernatant liquid was withdrawn and passed through a chelating resin (Amberlite IRC-718). The copper concentration was reduced from 11 ppm to below the analytical detection limit of 0.1 ppm.

EXAMPLE 4

This example illustrates the recovery of copper-EDTA complex from rinse water used to remove electroless copper plating bath from plated parts. A volume of Cu-EDTA plating rinse solution (11.3 ppm Cu) was passed through an OSMONICS ST10 reverse osmosis membrane at 500 psi. As the incremental volumes of the solution were passed through the membrane the retainate, permeate and filtered permeate were analyzed for copper concentration. The results shown in Table 1 show that reverse osmosis is effective in concentrating copper(II)EDTA complex.

TABLE 1

| | COPPER CONCENTRATION | | |
|---|---|---|---|
| RECOVERY % | RETAINATE ppm | PERMEATE ppb | FILTERED PERMEATE ppb |
| 0 | 11.3 | — | — |

TABLE 1-continued

| | COPPER CONCENTRATION | | |
|---|---|---|---|
| RECOVERY % | RETAINATE ppm | PERMEATE ppb | FILTERED PERMEATE ppb |
| 8 | 12.4 | 3 | 3 |
| 50 | 23.5 | 7 | 8 |
| 75 | 46.1 | 28 | 13 |
| 80 | 56.8 | 31 | 8 |
| 85 | 76.4 | 46 | 10 |
| 90 | 124.5 | 92 | 18 |

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A method for removing formate ions from aqueous solutions comprising dissolved metal associated with polyvalent counterions and/or chelants, comprising:
   (a) conducting said solution as a feed stream to a membrane filtration unit which is selectively permeable to monovalent anionic species, wherein said solution is under sufficient pressure in contact with said membrane unit to provide a permeate stream and a residual stream wherein the concentration of formate ions is essentially the same in the feed, permeate and residual streams and the concentration of metal ions is lower in the permeate stream and higher in the residual stream, and
   (b) conducting said permeate stream to an ion exchange unit containing (i) a chelating ion exchange resin capable of removing metal ions from a solution in which said metal ions are complexed a chelant having a binding energy on the order of the binding energy of copper tartrate or (ii) an anion exchange resin capable of removing metal chelant complexes from a solution in which said metal ions are complexed with a chelant having a binding energy on the order of the binding energy of copper EDTA, thereby providing a permeate stream essentially depleted of metal ions.

2. A method according to claim 1 wherein said aqueous solution is a copper electroless plating solution and said residual stream is recycled to said plating solution.

3. A method for removing formate ions from an aqueous solution comprising metal associated with polyvalent counterions or chelant, said method comprising:
   (a) delivering said solution to a solvent extraction unit comprising an organic solvent solution of a metal extractant for removing metal as a metal-extractant complex, wherein the metal extractant exhibits a binding energy in a metal-extractant complex that is greater than the binding energy of said metal to the polyvalent counterion or chelant species, wherein said solvent extraction unit is adapted for contacting a metal-containing feed stream with said organic solvent solution and for separating an organic stream containing metal-extractant complex and an aqueous stream depleted in said metal species, thereby providing an aqueous stream diminished in said metal species;
   (b) reducing the pH of the aqueous stream diminished in said metal species to selectively form a precipitate of the metal counterion or chelant species;
   (c) separating said precipitate of the metal counterion or chelant species to provide a stream substantially depleted in metal counterion or chelant species;
   (d) conducting said stream substantially depleted in metal counterion or chelant species to a membrane filtration unit which is selectively permeable to monovalent anionic species as a feed stream under sufficient pressure to provide a permeate stream and a residual stream wherein the concentration of formate ions is essentially the same in the feed, permeate and residual streams and the concentration of polyvalent anions is lower in the permeate stream and higher in the residual stream,
   (e) conducting said permeate stream to an ion exchange unit containing (i) a chelating ion exchange resin capable of removing metal ions from a solution in which said metal ions are complexed a chelant having a binding energy on the order of the binding energy or copper tartrate or (ii) an anion exchange resin capable of removing metal chelant complexes from a solution in which said metal ions are complexed with a chelant having a binding energy on the order of the binding energy of copper EDTA, thereby providing a stream containing formate ions and essentially depleted of metal ions and metal chelant complexes.

4. A method according to claim 3 wherein said aqueous solution is a copper electroless plating solution and said organic stream containing metal-extractant complex is stripped using an acid to provide a metal-bearing stream which is recycled to said plating solution.

5. A method for removing formate ion from an aqueous solution comprising dissolved metal associated with polyvalent counterion and/or chelant, comprising:
   (a) conducting said solution as a feed stream to a solvent extraction unit comprising an organic solvent solution of a metal extractant for removing said metal as a metal-extractant complex, wherein the metal extractant exhibits a binding energy in a metal-extractant complex that is greater than the binding energy of said metal to the polyvalent counterion or chelant species, and wherein said solvent extraction unit is adapted to contacting a metal-containing feed stream with said organic solvent solution and separating an organic stream containing metal-extractant complex and an aqueous stream depleted in said metal species; and
   (b) conducting said aqueous stream depleted in said metal species to an ion exchange unit containing (i) a chelating ion exchange resin capable of removing metal ions from a permeate solution in which said metal ions are complexed by a counterion or chelant having a binding energy on the order of the binding energy of copper tartrate or (ii) an anion exchange resin capable of removing metal chelant complexes from a solution in which said metal ions are complexed with a chelant having a binding energy on the order of the binding energy of copper EDTA; thereby providing a permeate stream essentially depleted of metal ions.

6. A method according to claim 5 wherein said aqueous solution is a copper electroless plating solution and said organic stream containing metal-extractant complex residual stream is treated with an acid stream to provide an aqueous stream containing the dissolved metal salt of said acid which is recycled to said plating solution.

7. A method according to claim 6 wherein said metal extractant is an N-alkyl alkanohydroxamic acid.

8. A method according to claim 7 wherein said extractant is an N-ethyl hydroxamic acid.

9. A method according to claim 5 wherein said aqueous solution is treated with acid to reduce the pH of the feed stream to about 8-10.

10. A method for removing formate ions from an aqueous solution comprising metal associated with polyvalent counterions or chelant, said method comprising:
(a) delivering said solution to a solvent extraction unit comprising an organic solvent solution of a metal extractant for removing metal as a metal-extractant complex, wherein the metal extractant exhibits a binding energy in a metal-extractant complex that is greater than the binding energy of said metal to the polyvalent counterion or chelant species, wherein said solvent extraction unit is adapted for contacting a metal-containing feed stream with said organic solvent solution and for separating an organic stream containing metal-extractant complex and an aqueous stream depleted in said metal species, thereby providing an aqueous stream diminished in said metal species;
(b) conducting said stream substantially depleted in metal counterion or chelant species to a membrane filtration unit which is selectively permeable to monovalent anionic species as a feed stream under sufficient pressure to provide a permeate stream and a residual stream wherein the concentration of formate ions is essentially the same in the feed, permeate and residual streams and the concentration of polyvalent anions is lower in the permeate stream and higher in the residual stream,
(c) conducting said permeate stream to an ion exchange unit containing (i) a chelating ion exchange resin capable of removing metal ions from a solution in which said metal ions are complexed a chelant having a binding energy on the order of the binding energy of copper tartrate or (ii) an anion exchange resin capable of removing metal chelant complexes from a solution in which said metal ions are complexed with a chelant having a binding energy on the order of the binding energy of copper EDTA, thereby providing a stream containing formate ions and essentially depleted of metal ions and metal chelant complexes.

11. A method according to 10 wherein said ion exchange unit contains resin functionalized with iminodiacetic acid groups.

12. A method according to claim 10 wherein said ion exchange unit contains resin functionalized with quaternary ammonium groups.

13. A method according to claim 10 wherein said metal extractant is an oxime or a hydroxamic acid.

14. A method according to claim 13 wherein said hydroxamic acid is an N-alkyl alkanohydroxamic acid.

15. Apparatus for removing copper and polyvalent anions from an aqueous solution comprising formate ion and dissolved copper associated with tartrate or EDTA, said apparatus comprising a membrane filtration unit selectively permeable to monovalent anions interconnected with an ion exchange unit; wherein said membrane filtration unit contains a reverse osmosis membrane adapted to remove monovalent anions from said solution to provide a permeate solution enriched in formate ions and a retainate solution enriched in tartrate or EDTA ions; and wherein said ion exchange unit is capable of removing copper from a solution of copper tartrate or copper EDTA to provide a product solution containing less than 0.1 ppm copper.

16. Apparatus according to claim 15 wherein said ion exchange unit contains resin functionalized with iminodiacetic acid groups.

17. Apparatus according to claim 15 wherein said ion exchange unit contains resin functionalized with quarternary ammonium groups.

18. Apparatus for removing copper and polyvalent anions from an aqueous solution comprising formate ion and dissolved copper associated with tartrate or EDTA, said apparatus comprising a solvent extraction unit interconnected with an ion exchange unit; wherein said solvent extraction unit comprises an organic solvent solution of a metal extractant capable of removing copper from solutions of copper tartrate or copper EDTA and wherein said ion exchange unit is capable of removing copper from solutions of copper tartrate and copper EDTA to provide a product solution containing less than 0.1 ppm copper.

19. Apparatus according to claim 18 wherein said ion exchange unit contains resin functionalized with iminodiacetic acid groups.

20. Apparatus according to claim 18 wherein said ion exchange unit contains resin functionalized with quaternary ammonium groups.

21. Apparatus according to claim 18 wherein said metal extractant is an oxime or a hydroxamic acid.

22. Apparatus according to claim 21 wherein said hydroxamic acid is an N-alkyl alkanohydroxamic acid.

23. Apparatus for removing copper and polyvalent anions from an aqueous solution comprising formate ion and dissolved copper associated with tartrate or EDTA, said apparatus comprising a solvent extraction unit interconnected with a membrane filtration unit selectively permeable to monovalent anions and an ion exchange unit; wherein said solvent extraction unit comprises an organic solvent solution of a metal extractant capable of removing copper from solutions of copper tartrate or copper EDTA, wherein said membrane filtration unit contains a reverse osmosis membrane adapted to remove monovalent anions from said solution to provide a permeate solution enriched in formate ions and a retainate solution enriched in tartrate or EDTA ions, and wherein said ion exchange unit is capable of removing copper from solutions of copper tartrate or copper EDTA to provide a product solution containing less than 0.1 ppm copper.

24. Apparatus according to claim 23 wherein said ion exchange unit contains resin functionalized with iminodiacetic acid groups.

25. Apparatus according to claim 23 wherein said ion exchange unit contains resin functionalized with quaternary ammonium groups.

26. Apparatus according to claim 23 wherein said metal extractant is an oxime or a hydroxamic acid.

27. Apparatus according to claim 26 wherein said hydroxamic acid is an N-alkyl alkanohydroxamic acid.

* * * * *